Sept. 10, 1963 J. R. COLE ETAL 3,103,616
SIGNAL CONTROLLED INVERTER-POWER AMPLIFIER
Filed Dec. 8, 1961 6 Sheets-Sheet 1

INVENTORS
JIMMY R. COLE
JOE W. WALTON
BY
*William J. Mills*
ATTORNEY

Sept. 10, 1963  J. R. COLE ETAL  3,103,616
SIGNAL CONTROLLED INVERTER-POWER AMPLIFIER
Filed Dec. 8, 1961                                                              6 Sheets-Sheet 2

INVENTORS
JIMMY R. COLE
JOE W. WALTON
BY
*William J. Walter*
ATTORNEY

INVENTORS
JIMMY R. COLE
JOE W. WALTON

ATTORNEY

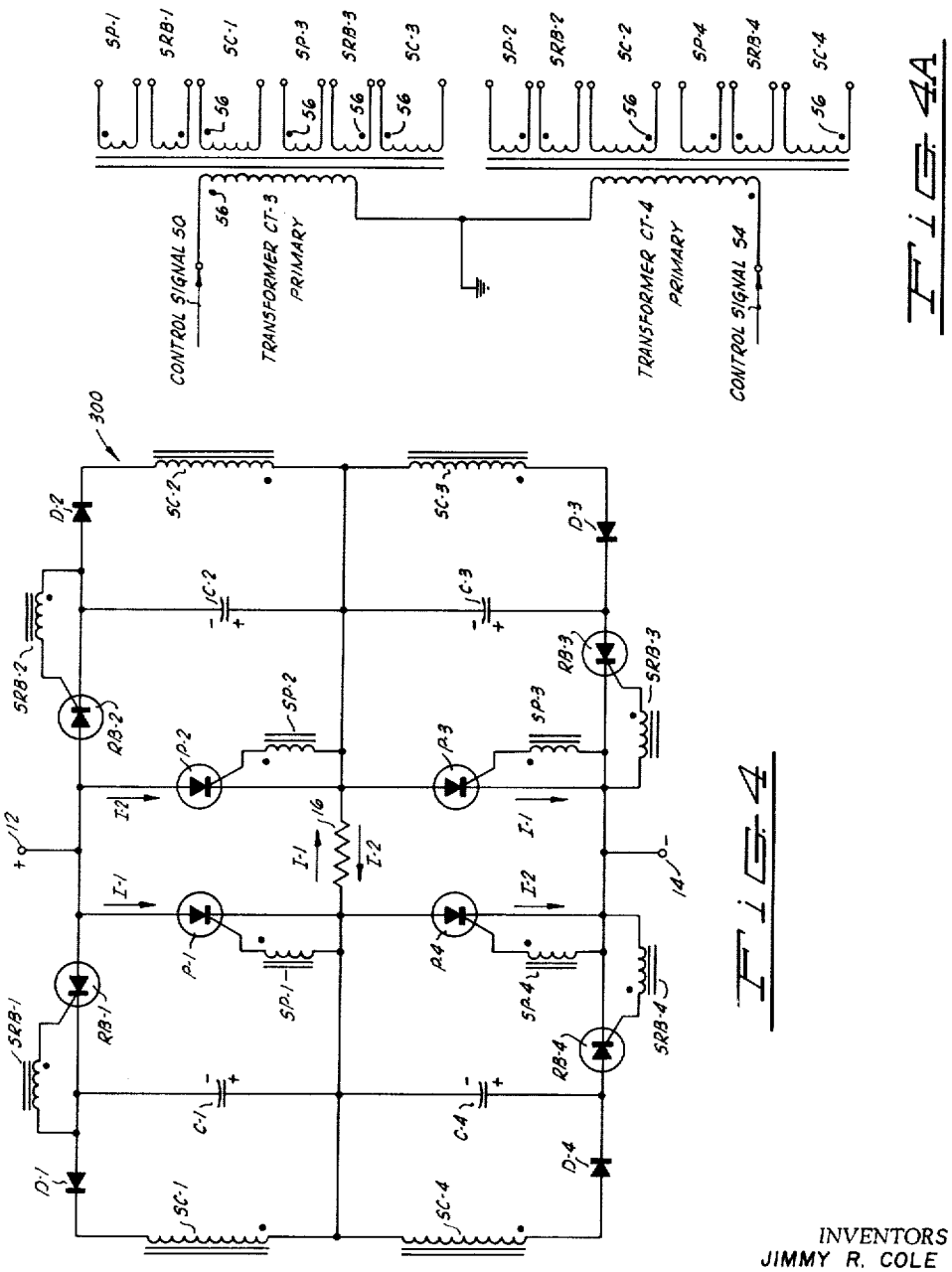

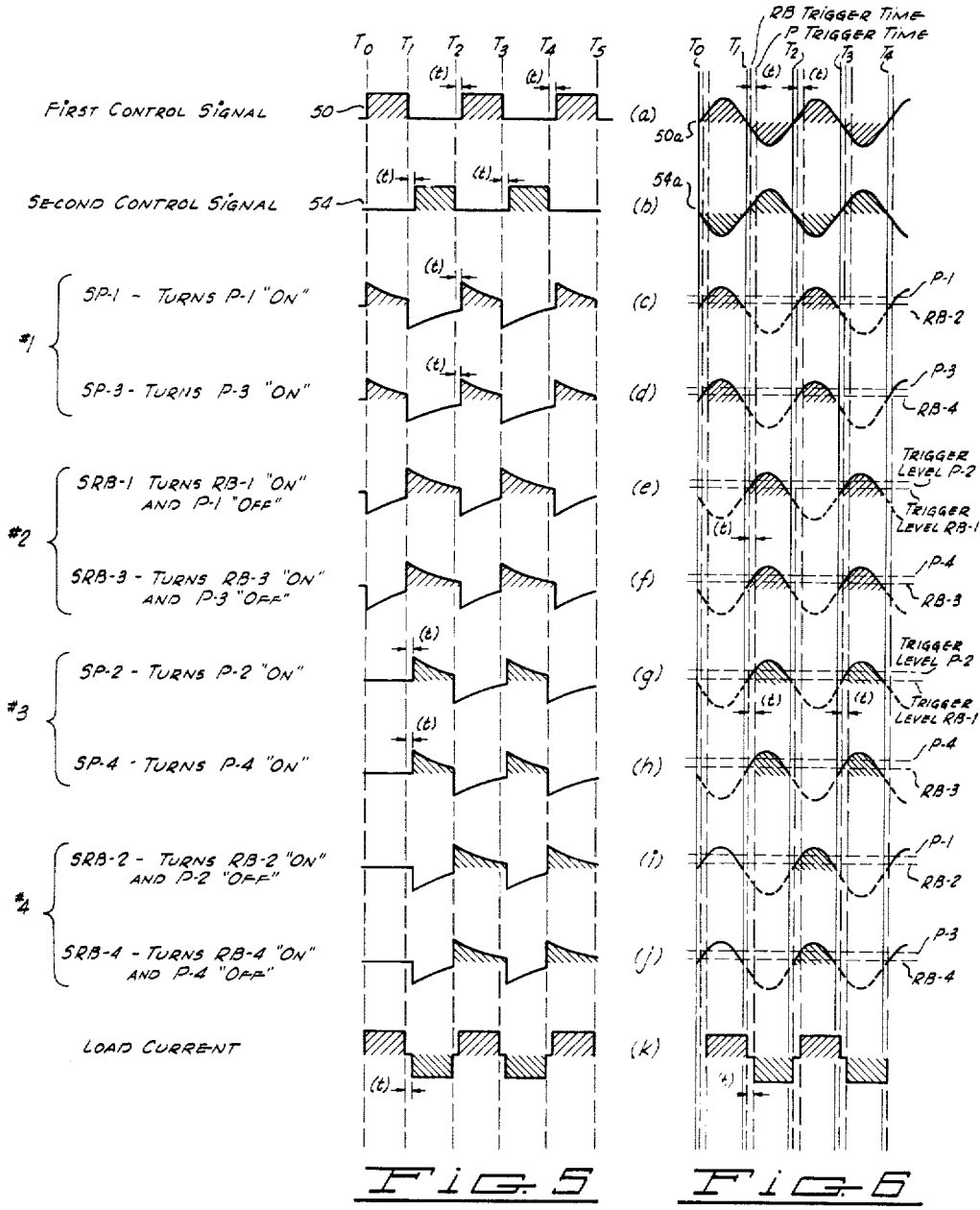

Sept. 10, 1963    J. R. COLE ETAL    3,103,616
SIGNAL CONTROLLED INVERTER-POWER AMPLIFIER
Filed Dec. 8, 1961    6 Sheets-Sheet 6
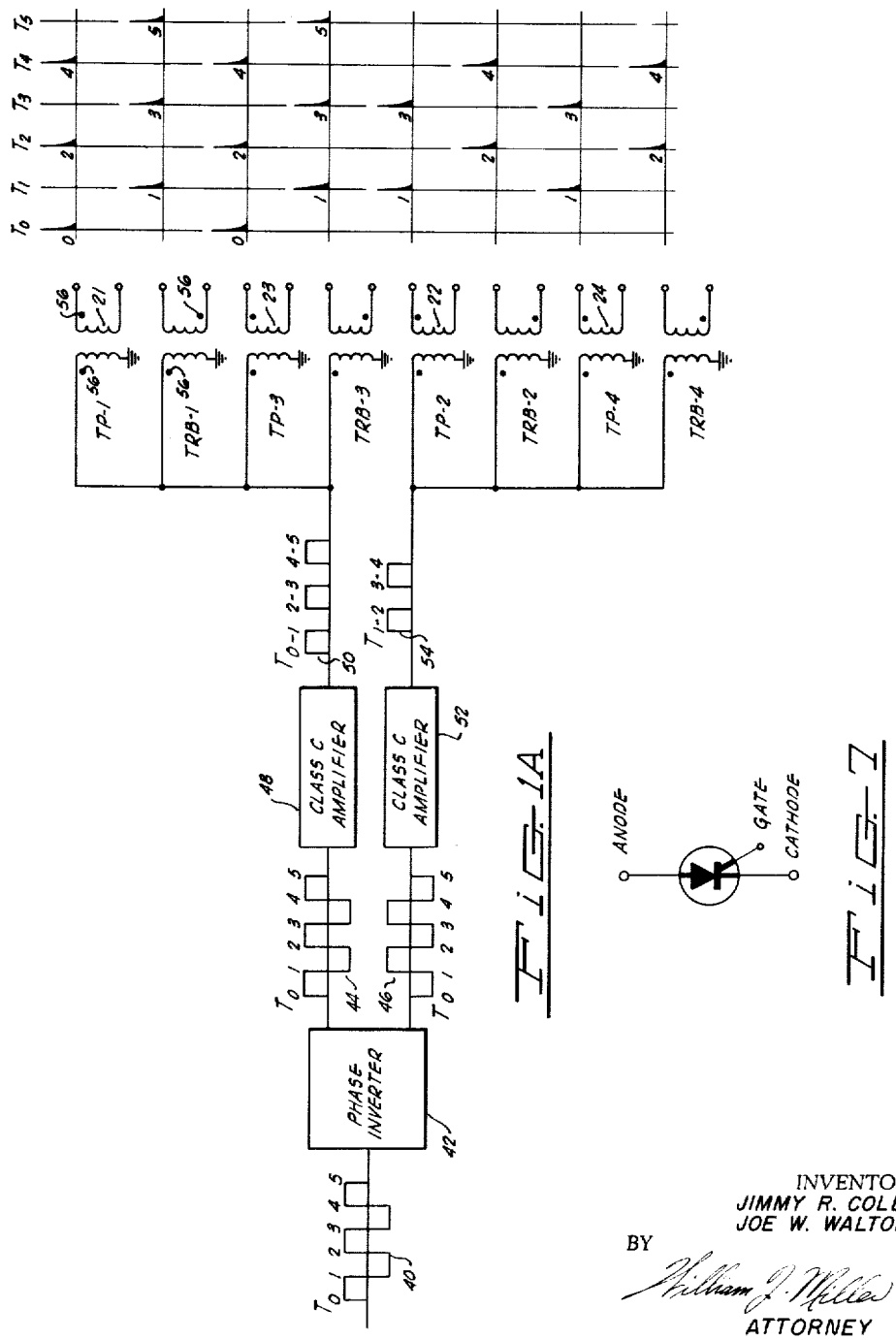
INVENTORS
JIMMY R. COLE
JOE W. WALTON
BY
ATTORNEY

# United States Patent Office 3,103,616
Patented Sept. 10, 1963

3,103,616
SIGNAL CONTROLLED INVERTER-POWER
AMPLIFIER
Jimmy R. Cole and Joe W. Walton, Ponca City, Okla.,
assignors to Continental Oil Company, Ponca City,
Okla., a corporation of Delaware
Filed Dec. 8, 1961, Ser. No. 158,081
17 Claims. (Cl. 321—45)

The present invention relates to alternating current power amplifiers, and more particularly, but not by way of limitation, relates to a circuit device which may be termed a signal controlled, synchronous inverter for converting high-power direct current to high-power alternating current having a frequency corresponding to a low-level, variable frequency, alternating current control signal.

More specifically, this invention is related to electrical circuitry for driving electromagnetic transducers of the type used in modern geophysical equipment. U.S. Patent No. 2,989,726 issued to John M. Crawford and William E. N. Doty on June 20, 1961, discloses a method of seismic exploration which uses nonrepetitive seismic signals of known frequency content and magnitude rather than the random frequency content of the seismic signal produced by the more conventional explosive charge. The nonrepetitive seismic signal of known frequency content is reflected from subsurface interfaces and is easily distinguished from other interfering noise to produce easily readable and highly reliable seismic data. The nonrepetitive seismic signal may comprise, for example, frequencies from 20 to 100 cycles per second, starting at the low frequency and increasing at a uniform rate over a short period of time to the higher frequency. It has been found that electromagnetic transducers similar to large loud speakers provide an excellent means for imparting the seismic signal to the earth. However, these transducers must necessarily be large in order to induce sufficient energy into the earth that the signals will be reflected from deep subterranean strata. Frequently it is necessary to employ a plurality of transducers operated simultaneously and in synchronism. The problem of supplying electrical power to drive the electromagnetic transducers is formidable because, as with most geophysical equipment, the electrical power equipment must be readily portable, very rugged and always reliable.

The obvious method for driving a plurality of electromagnetic transducers with synchronized, non-repetitive signals of known frequency content is to generate an electrical signal from a single source, amplify the signal through a power amplifier or amplifiers, and supply the amplified signal to the electromagnetic transducers. Unfortunately, the size of the synchronized power amplifiers becomes prohibitive when more than a few electromagnetic transducers are operated simultaneously.

Vacuum tube type power amplifiers do not warrant serious consideration because of large size and lack of ruggedness for portability. Heretofore in the art, the most satisfactory power amplifier source employed various combinations of transistors connected with the load to form a bridge. Some type of control circuit was provided to switch the transistors in the bridge by pairs alternately from "cutoff" to "saturation" and back to "cutoff" in synchronism with the control signal thereby converting a direct current power source, such as a battery, to a bidirectional power current for driving the electromagnetic transducers. This type power source is somewhat satisfactory but has a limited maximum power output. For example, the transistorized power equipment was limited to approximately 1000 watts output by the power ratings of the various components.

The present invention contemplates an inverter device particularly well adapted for use in a controllable frequency power supply for driving electromagnetic transducers used in geophysical work. The inverter device employs a semiconductor device having a much higher power rating than presently available transistors. The devices are known in the art as controlled rectifiers, and in the most popular presently available form, are known as silicon controlled rectifiers and are therefore casually referred to in the art as SCR's, as will hereafter be the case in this specification and some of the appended claims. The controlled rectifiers used in connection with this invention, have what is conventionally termed an anode, a cathode and a gate, which are labeled in FIGURE 7 which is an enlarged view of the conventional symbol used in the art to represent a controlled rectifier. The conventional forward direction across the controlled rectifier is from anode to cathode. The operating characteristics of the controlled rectifier are such that the device will, for all practical purposes, block current in both the forward and reverse directions within the forward and reverse breakover and breakdown voltages. In this state, the controlled rectifier is said to be "cutoff" or "off." However, when a positive trigger pulse of relatively low potential is applied to the gate, the controlled rectifier will turn "on" and conduct in the forward direction with substantially no impedance when a potential is applied from anode to cathode. The controlled rectifier will continue to conduct in the forward direction until the forward potential is reduced substantially to zero by either removing the forward potential or by applying a reverse bias to overcome the forward potential for a short period of time. However, in order to switch the controlled rectifier to "cutoff" in a minimum of time, a reverse bias must be applied for a short period of time. Additional detailed information concerning the operating characteristics of the SCR device may be obtained from Controlled Rectifier Manual, published by General Electric Company in 1960.

In accordance with the present invention, four controlled rectifiers are connected to form a bridge with the load to be driven. This may be accomplished by connecting the first controlled rectifier, the first terminal of the load, and the fourth controlled rectifier in series in the forward direction across a direct current power source, such as a battery. Similarly, the second controlled rectifier, the second terminal of the load, and the third controlled rectifier are connected in series in the forward direction across the direct current power source. Then by alternately turning the first and third, then the second and fourth controlled rectifiers "on," the direct current from the power source will be directed first in one direction and then in the other direction through the load. The present invention also contemplates a novel circuit for synchronizing the switching of the controlled rectifiers with a variable frequency control signal so that the frequency content of the alternating power current through the load will correspond with that of the control signal. It is further contemplated by the present invention to provide a novel circuit means for reverse biasing the several controlled rectifiers of the bridge to "cutoff" condition by utilization of the energy stored by a capacitor. It is also within the purview of this invention to provide several alternative circuit means for applying the energy or stored charge on the capacitors which are utilized to reverse bias the several controlled rectifiers.

Therefore it is an important object of the present invention to provide an improved inverter device for converting a direct current power supply to an alternating current power supply having a frequency which is synchronized with that of a control signal.

Another important object of the present invention is to provide an inverter device of the type described having a greatly increased power rating and which is therefore particularly adapted as a power supply for driving electromagnetic transducers used in geophysical exploration.

Another important object of the present invention is to provide an inverter device of the type described which produces a square wave alternating current from a direct current power source whereby the square wave will have maximum power for the given maximum voltage of the direct current power source.

Another important object of the present invention is to provide an inverter device of the type described which is capable of producing an alternating current ranging in frequency from zero, or direct current, to several hundred cycles per second.

Another important object of the present invention is to provide an inverter device of the type described having an extremely low output impedance.

Another important object of the present invention is to provide an inverter which is capable of being synchronized with an input signal.

Another important object of the present invention is to provide an inverter device of the type described in which all components will be in the "cutoff" condition after cessation of the control signal.

Another important object of the present invention is to provide a simple and reliable circuit for reverse biasing a controlled rectifier using a source of potential of no greater magnitude than the potential applied in the forward direction across the rectifier, and in most cases using the same direct current potential.

Another important object of the present invention is to provide an inverter device of the type described in which the components in the control circuitry for switching the controlled rectifiers to "cutoff" may be reduced to minimum power ratings.

Another important object of the present invention is to provide an inverter device of the type described which may be operated, except for the control signal, entirely by an alternating current power source such as a three-phase alternator.

Another object of the present invention is to provide an inverter device of the type described which utilizes a low-level control signal for reverse biasing the controlled rectifiers to "cutoff" condition.

Many additional objects and advantages of the present invention will be evident to those skilled in the art from the following detailed description of the preferred embodiments illustrated in the drawings.

In the drawings:

FIGURE 1A is a schematic diagram of a control circuit which may be used in combination with the inverter devices of FIGURES 1, 2, 3 and 4, and in particular should be considered in combination with FIGURE 1.

FIGURE 4 is a schematic circuit diagram of still another inverter device constructed in accordance with the present invention.

FIGURE 4A is a schematic circuit diagram which should be considered in combination with FIGURE 4.

FIGURES 5 and 6 are a series of graphs illustrating the various potentials induced in the secondary windings of the control transformers and the time relation therebetween when square wave control signals and sinusoidal control signals, respectively, are used to control the various inverter devices of the present invention.

FIGURE 7 is a diagram of the conventional symbol used to designate a controlled rectifier or SCR used in the inverter devices constructed in accordance with the present invention.

A standard electrical circuit symbol for a silicon controlled rectifier or SCR is shown in FIGURE 7. The semi-conductor device has an anode terminal, a cathode terminal and a gate terminal as labeled. The conventional forward direction is from anode to cathode. The SCR can be triggered "on" by making the gate positive with respect to the cathode. Then when a forward potential is applied, i.e., when the anode is made more positive than the cathode, the SCR will conduct in the forward direction. The SCR can be reverse biased to "cutoff" by making the cathode more positive than the anode for a short period of time, provided of course the gate is not maintained positive with respect to the cathode.

Figure 1:
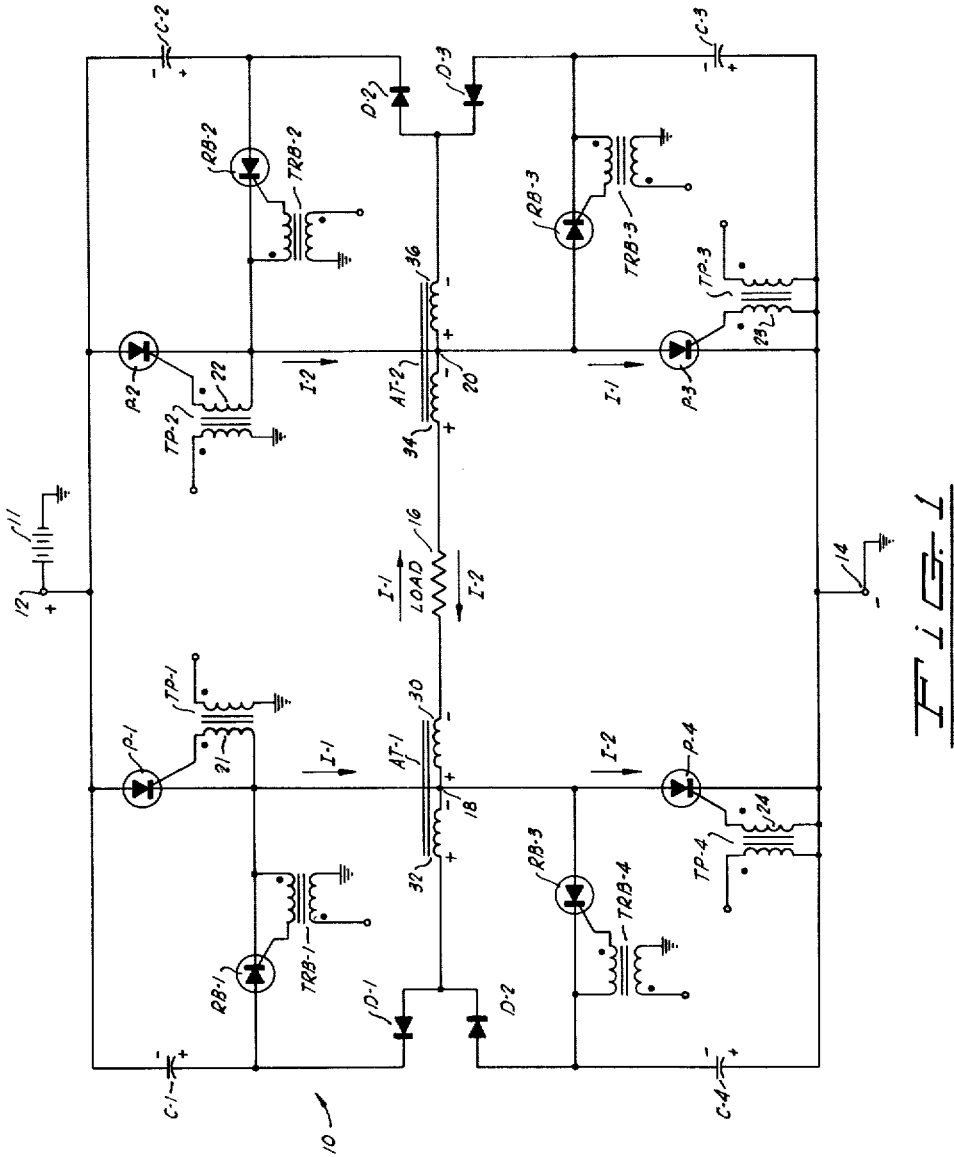
FIGURE 1 is a schematic circuit diagram of an inverter device constructed in accordance with the present invention.

Referring now to FIGURE 1, a direct current power source, such as battery 11, is connected across a positive power terminal 12 and a negative power terminal 14 of an inverter device 10. A load 16 to be driven by the inverter device 10 has first and second load terminals 18 and 20. The load 16 may be the coil of an electromagnetic transducer used in seismographic surveying. A first power SCR P–1 is connected in the forward direction between the positive power terminal 12 and the first load terminal 18. A fourth power SCR P–4 is connected in the forward direction between the first load terminal 18 and the negative power terminal 14. A second power SCR P–2 is connected in the forward direction between the positive power terminal 12 and the second load terminal 20, and a third power SCR P–3 is connected in the forward direction between the load terminal 20, and the negative power terminal 14.

The four power SCR's are connected to the load 16 in such a manner as to form what may be termed a power bridge. When the odd-numbered power SCR's P–1 and P–3 are turned "on" and the even-numbered SCR's P–2 and P–4 turned "off," a direct current I–1 from the battery power source 11 will flow in the direction of the arrows through power SCR P–1, the load 16 and through power SCR P–3. Then when the power SCR's P–1 and P–3 are turned "off" and the power SCR's P–2 and P–4 are turned "on," a current I–2 will flow through SCR P–2, through the load 16, and through SCR P–4 in the direction indicated by the arrows. In this manner the unidirectional or direct current of the battery power source 11 is converted to a bidirectional or alternating current through the load 16. The alternating current through the load 16 will have a frequency corresponding to the rate at which the first and third and the second and fourth power SCR's are switched "on" and "off" as described.

As previously mentioned the power SCR's are easily switched from the current locking or "cutoff" state to the conducting or "on" state by a trigger pulse of positive potential applied to the gate, the potential at the gate being positive with respect to the cathode. Then any positive potential applied in the forward direction from anode to cathode will cause a current to flow in the forward direction through the SCR. Therefore, the secondary windings 21, 22, 23 and 24 of control transformers TP–1, TP–2, TP–3 and TP–4 respectively, are connected between the cathode and gate of the respective power SCR's P–1, P–2, P–3 and P–4. A control signal is applied to the primary windings of the respective transformers in order to induce the positive trigger pulses in the transformer secondary windings in a sequence hereafter described in detail.

Although it is a relatively simple matter to switch the power SCR's "on," it is far more difficult to switch them "off." As previously mentioned, in order to turn the SCR's "off" in a minimum time, which is virtually essential in the present application as hereafter explained, the respective SCR's must be reverse biased by driving the cathode of the SCR more positive than the anode. The period of time during which the SCR must be reverse biased is relatively short, but does require a finite time, as hereafter explained in greater detail.

A reverse bias loop circuit comprised of a capacitor C-1 and a reverse bias SCR RB-1 is connected across the anode and cathode of the power SCR P-1. It will be noted that the reverse bias SCR RB-1 is connected in opposition to the power SCR P-1 in that the cathodes and anodes of the two SCR's are connected to each other in the reverse bias loop circuit. Similarly, a reverse bias loop circuit is provided for power SCR P-2 comprised of a capacitor C-2 and a reverse bias SCR RB-2. The reverse bias circuit for the power SCR P-3 is comprised of the capacitor C-3 and the reverse bias SCR RB-3. The reverse bias circuit for the power SCR P-4 is comprised of the capacitor C-4 and the reverse bias SCR RB-4. In each case it will be noted that the respective reverse bias SCR's are connected in opposition within the reverse bias loop circuit to the respective power SCR.

A charging circuit is provided for charging each of the capacitors C-1, C-2, C-3 and C-4 to a potential of a polarity and magnitude sufficient to the reverse bias the power SCR's when discharged. The capacitor charging circuits comprise the primary winding 30 of a first autotransformer AT-1 which is connected between the first load terminal 18 and the load 16 so that both currents I-1 and I-2 will pass through the primary winding 30. The secondary winding 32 of the first transformer AT-1 is connected through a diode D-1 to charge the capacitor C-1 by means of the charging loop circuit starting at the first load terminal 18, through the diode D-1, the capacitor C-1, through the power SCR P-1, which will be turned "on" during the charging period as hereafter described, and back to the first load terminal 18. The polarity of the primary and secondary windings 30 and 32 is as indicated by the symbols when the power SCR's P-1 and P-2 are conducting the current I-1 through the primary windings 30. Therefore, the current induced in the secondary windings 32 will pass through the diode D-1 and charge the capacitor C-1 to a polarity indicated by the symbols. Of course, the current in the secondary windings will be introduced only during the rise of the current I-1 as the power SCR's P-1 and P-2 are switched "on." As the current I-1 falls, the diode D-1 will prevent discharge of the capacitor C-1 through the charging circuit. Similarly, the reverse bias SCR RB-1, which blocks current in either direction when in the "cutoff" state, prevents the capacitor C-1 from discharging through the reverse bias circuit until the reverse bias SCR RB-1 is turned "on," at which time the capacitor C-1 will discharge to reverse bias the power SCR P-1 to "cutoff," as hereafter described in greater detail.

A similar charging circuit is provided for charging the capacitor C-2. The primary winding 34 of a second autotransformer AT-2 is connected between the load 16 and the second load terminal 20. The secondary winding 36 of the autotransformer AT-2 is connected through a diode D-2 to charge the capacitor C-2 during the rise of the current I-2 as hereafter explained. The charging circuit for the capacitor C-3 is comprised of the secondary winding 36 of the transformer AT-2 which is connected through a diode D-3 to charge the capacitor C-3 during the rise of the current I-1. It will be noted that the diode D-3 is reversed with respect to the diode D-2 so that current generated in the secondary winding 36 will pass alternately through the diode D-2 or the diode D-3 depending upon whether the current I-1 or I-2 is passing through the primary as hereafter described in detail. Similarly, the charging circuit for the capacitor C-4 comprises the secondary winding 32 of the first autotransformer AT-1 which is connected through the diode D-4 to charge the capacitor C-4. It will also be noted that the diode D-4 is reversed with respect to the diode D-1.

When the power SCR's P-1 and P-3 are turned "on," the current I-1 will flow through the load and the primary windings 30 and 34. A polarity will be induced in the secondary windings 32 and 36 as indicated by the symbols during the rise of the current I-1. This polarity current in the secondary windings 32 and 36 will then charge the capacitor C-1 to the polarity indicated through the loop circuit including the diode D-1 and the power SCR P-1. Similarly, the current induced in the secondary winding 36 will charge the capacitor C-3 through the diode D-3 and the power SCR P-3 to the polarity indicated by the symbols. In each case the charge will be retained on the respective capacitors by operation of the diodes D-1 and D-3 and the reverse bias SCR's RB-1 and RB-3 until such time as the reversed bias SCR's are turned "on" as hereafter described. When the power SCR's P-1 and P-3 are turned "off" and SCR's P-2 and P-4 are turned "on," the current I-2 will flow through the load 16 and the primary windings 30 and 34. A current will then be induced in the secondary windings 32 and 36 having a polarity opposite to that indicated by the symbols. The current induced in the secondary winding 36 will pass through the diode D-2 and charge the capacitor C-2. The power SCR P-2 completes this charging loop circuit. The diode D-2 and reverse bias SCR RB-2 prevent the capacitor C-2 from discharging. Similarly, the current in the secondary winding 32, which is opposite in polarity to the symbols, will charge the capacitor C-4 through the diode D-4. Of course, the diode D-4 and the reverse bias SCR RB-4 will prevent the capacitor C-4 from discharging.

In order to control the instant at which the respective capacitors C-1, C-2, C-3 and C-4 discharge to reverse bias the respective power SCR's to "cutoff," the secondary windings of transformers TRB-1, TRB-2, TRB-3 and TRB-4 are connected between the gate and cathode of the respective reverse bias SCR's. Therefore, merely by applying a current to the primary winding of the respective transformers TRB (see FIG. 1A) of the proper polarity, a positive trigger pulse can be applied to turn the respective reverse bias SCR's "on" and discharge the respective capacitors to reverse bias the respective power SCR's to "cutoff." After each of the reverse bias SCR's RB-1, RB-2, RB-3 and RB-4 have been triggered "on" and the respective capacitors discharged, the potential across the respective reverse bias SCR's will reduce to zero and the SCR's will revert to "cutoff" in preparation for the next charging cycle.

Therefore, from the above description it will be seen that in order to produce an alternating current through the load 16, it is necessary to sequentially: (1) trigger the power SCR's P-1 and P-3 "on" by a positive pulse induced in the secondary windings of the transformers TP-1 and TP-3; (2) trigger the reverse bias SCR's RB-1 and RB-3 "on" to discharge the capacitors C-1 and C-3 and reverse bias the power SCR's P-1 and P-3 to "cutoff"; (3) trigger the power SCR's P-2 and P-4 "on" by a positive pulse induced in the secondary windings of the transformers TP-2 and TP-4; and, (4) trigger the reverse bias SCR's RB-2 and RB-4 "on" to discharge the capacitors C-2 and C-4 and reverse bias the power SCR's P-2 and P-4 to "cutoff."

A control circuit for switching the inverter device 10 of FIG. 1 in synchronism with a control signal is schematically shown in FIG. 1A. It will be noted that the eight transformers shown in FIG. 1A have reference characters corresponding to the transformers of FIG. 1. A square wave alternating current basic control signal 40, which may be generated by any suitable source, is passed through a phase inverter 42 to produce first and second alternating current secondary control signals 44 and 46. It will be noted that the signal 44 is identical to the basic control signal 40 both as to phase and shape, as can be seen by a comparison of the time points $T_0$ through $T_5$. However, the secondary control signal 46 is 180 degrees out of phase with the secondary control signal 44 and therefore with the basic control signal 40. The control signal 44 is passed through a class "C" amplifier 48 which produces a control signal 50 having only positive square-shaped pulses between times $T_0$–$T_1$, $T_2$–$T_3$ and $T_4$–$T_5$, as indicated in FIG. 1A. The signal 46 is fed through a similar class "C" amplifier 52 to produce a control signal 54 having positive pulses which alternate in time with the positive pulses of the control signal 50, the square-shaped positive pulses being between times $T_1$–$T_2$ and $T_3$–$T_4$, as indicated in FIG. 1A. The preferred shape of the control signals 50 and 54 are shown in greater detail in FIG. 5 and are hereafter described in greater detail. The control signal 50 is applied to the primary windings of the transformers TP–1 and TRB–1 which respectively turn the power SCR P–1 "on" and "off," and transformers TP–3 and TRB–3, which respectively turn the power SCR P–3 "on" and "off." Similarly, the control signal 54 is connected to the primary windings of the transformers TP–2 and TRB–2, which respectively turn power SCR P–2 "on" and "off," and transformers TP–4 and TRB–4 which respectively turn power SCR P–4 "on" and "off."

The polarity of the secondary windings of the transformer TP–1 with respect to the primary winding is such that during the rise times $T_0$, $T_2$ and $T_4$ of the control signal 50, a positive pulse will be induced in the secondary winding 21 which will be applied to the gate of the power SCR P–1. Therefore, upon each rise of the signal 50, a positive pulse will be induced in the secondary winding 20 approximately at times $T_0$, $T_2$ and $T_4$ and the power SCR P–1 will be triggered "on" at these times. The secondary winding in the transformer TRB–1 is reversed with respect to that of transformer TP–1 such that a positive pulse is induced in the secondary winding of transformer TRB–1 by the fall of the control signal 50 at times $T_1$, $T_3$ and $T_5$, for example. Therefore, at times $T_1$, $T_3$ and $T_5$, a positive pulse is applied to the gate of the reverse bias SCR RB–1 to discharge the capacitor C–1 and thereby reverse bias the power SCR P–1 to "cutoff" at each of these times. Therefore, the power SCR P–1 is turned "off" at time $T_1$ and remains "off" until time $T_2$. In this respect it will be noted in the drawings that when the polarity dots such as 56, are matched as in transformer TP–1, a positive pulse will be induced in the secondary winding during the rise of the current in the primary winding. Accordingly, in transformer TRB–1, where the reference dots 58 are arranged oppositely, a positive current will be induced in the secondary winding during the fall of the signal current in the primary winding.

Since the same control signal 50 is applied to the primary winding of the transformer TP–3, a positive trigger pulse will be induced in the secondary winding 23 of the transformer TP–3 at times $T_0$, $T_3$ and $T_5$ in exact synchronization with the trigger pulse induced in the secondary winding 21 of transformer TP–1. Therefore, the power SCR P–3 will be turned "on" simultaneously with power SCR P–1. The same control signal 50 is applied to the primary winding of the transformer TRB–3, but as in the case of transformer TRB–1, the secondary winding is reversed so that a positive trigger pulse is induced during the fall of the current to trigger the reverse bias SCR's RB–1 and RB–3 "on" at times $T_1$, $T_3$ and $T_5$, and thereby reverse bias the power SCR's P–1 and P–3 to "cutoff." Therefore, the power SCR's P–1 and P–3 are turned "on" and "off" in precise synchronization.

As previously mentioned, the control signal 54 is applied to the primary winding of the transformer $T_2$. A positive trigger pulse will be induced in the secondary windings 22 during the rise of the control signal current at times $T_1$ and $T_3$ and, since the secondary winding 22 is connected to control the power SCR P–2, the power SCR P–2 will be turned "on" at times $T_1$ and $T_3$. Similarly, a positive trigger pulse is induced in the secondary winding of the transformer TRB–2 during the fall times $T_2$ and $T_4$ to turn the power SCR P–2 "off." In the same manner, positive trigger pulses are induced in the secondary windings of the transformer TP–4 by the control signal 54 at times $T_1$ and $T_3$ to turn the power SCR P–4 "on"; and positive trigger pulses are generated in the secondary winding of the transformer TRB–4 at times $T_2$ and $T_4$ to trigger the reverse bias SCR's RB–2 and RB–4 "on" and thereby reverse bias the power SCR's P–2 and P–4 to "cutoff." Therefore, it will be seen that during time period $T_0$–$T_1$, the power SCR's P–1 and P–3 are turned "on" and the power SCR's P–2 and P–4 remain "off" to produce a current I–1 through the load 16; and during time $T_1$–$T_2$, the power SCR's P–2 and P–4 are turned "on" and the SCR's P–1 and P–3 are reverse biased to "cutoff" to direct the current I–2 through the load.

In summary, when the direct current power source, such as the battery 10, is connected across the power terminals 12 and 14, no current will flow through the load 16. However, when the control signals 50 and 52 are applied to the primary windings of the eight control transformers shown in FIG. 1A, the inverter device 10 will operate as follows: At time $T_0$ the positive trigger pulse induced in the secondary windings 20 and 23 of control transformers TP–1 and TP–3 will be applied to the gates of the power SCR's P–1 and P–3 to switch the power SCR's "on." Current I–1 will then flow through SCR P–1, through the primary winding 30 of the autotransformer AT–1, through the load 16, through the primary winding 34 of the autotransformer AT–2, and through the power SCR P–3. The current I–1 flowing through the primary winding of the autotransformer AT–1 will induce a current in the secondary winding 32 having a polarity as indicated. This induced current will pass through the diode D–1 and charge the capacitor C–1 through the loop charging circuit including the SCR P–1. Of course, only the rise of the current I–1 when it is first turned "on" charges the capacitor C–1, and the charge is maintained on the capacitor C–1 by operation of the diode D–1 and the fact that the SCR RB–1 is "off." Similarly, the current induced in the secondary winding 36 of autotransformer AT–2 is of a polarity indicated by the symbols so that the capacitor C–3 is charged by conventional current passing through the power SCR P–3 to the capacitor C–3, and through the diode D–3 back to the secondary winding 36. The charge on the capacitor C–3 will be retained by the diode D–3 and the reverse bias SCR RB–3, which is "off."

At time $T_1$ a positive trigger pulse will be induced in the secondary windings of the transformers TRB–3 and TRB–1 and applied to the gates of the reverse bias SCR's RB–1 and RB–3. The reverse bias SCR's RB–1 and RB–3 are then turned "on" to discharge the capacitors C–1 and C–3 and reverse bias the power SCR's P–1 and P–3 to the "cutoff" condition. When the charge from the respective capacitors has dissipated, the potential across the reverse bias SCR's RB–1 and RB–3 will be reduced to zero and the reverse bias SCR's will revert to "cutoff" preparatory to the next charging cycle. Almost simultaneously at time $T_1$, a positive trigger pulse is induced in the secondary windings 22 and 24 of the control transformers TP–2 and TP–4 and are applied to the gates of the power SCR's P–2 and P–4 respectively, thereby switching the power SCR's "on." The current I–2 then passes through the load 16 as indicated, also passing through the primary windings 30 and 34 of the autotransformers AT–1 and AT–2. Since the current in the primary winding 34 is now reversed to that indicated by the symbols in FIG. 1, the current induced in the secondary winding 36 of transformer AT-2 will also be of reversed polarity. The induced current in the secondary winding 36 will pass through the diode D-2 and charge the capacitor C-2, the charging loop circuit being completed through the now conducting SCR P-2. Similarly, the current induced in the secondary winding 32 is of a polarity opposite to that indicated so that conventional current passes through the now conducting power SCR P-4 to charge the capacitor C-4, the charging circuit being completed through the diode D-4 to the secondary winding 32. The diodes D-2 and D-4 prevent discharge of the capacitors C-2 and C-4 as do the reverse bias SCR's RB-2 and RB-4. The current I-2 flows through the load from time $T_1$ until time $T_2$. At time $T_2$ positive trigger pulses are induced in the secondary windings of the transformers TRB-2 and TRB-4 by the fall of the control signal 54 and are applied to the gates of the reverse bias SCR's RB-2 and RB-4 respectively to switch the reverse bias SCR's "on." The capacitors C-2 and C-4 will then be discharged to reverse bias the power SCR's P-2 and P-4 to "cutoff."

This sequence of events will continue so long as the control signals 50 and 54 are applied to the primary windings of the control transformers as described. However, it should be noted that upon cessation of the control signals 50 and 54, all of the SCR's will be in the "cutoff" or current blocking condition. The power SCR's P-1, P-2, P-3 and P-4 will be "cutoff" by the discharge of the respective capacitors through the reverse bias circuits. The reverse bias SCR's RB-1, RB-2, RB-3 and RB-4 return to the "cutoff" state merely by reason of the fact that the potential across the respective SCR's is reduced to zero upon discharge of the respective capacitors. Although this is the slower method for switching the reverse bias SCR's to "cutoff," it is sufficiently fast for the present application.

From the above description it will be evident that a substantially square wave alternating current will be applied to the load 16 to provide maximum power for any given potential of the battery power source 10. The square wave alternating power current is in precise synchronism with the input control signal 40. The frequency of the alternating power current provided by the inverter device can be varied from zero, i.e., direct current, to several hundred cycles per second simply by varying the frequency of the low level control signal 40. The upper limit on the power frequency is limited primarily by the period of time required to switch the power SCR's to "cutoff" after the reverse bias has been applied. In this regard it is desirable that the control signals 50 and 54 have a dwell or delay time between the fall of one signal, and the rise of the other signal to assure sufficient time for the power SCR's to be reverse biased to "cutoff" as will hereafter be explained in greater detail in the discussion of FIGURES 5 and 6.

Since transformers TP-1, TRB-1, TP-3 and TRB-3 are each connected to receive the control signal 50 in their primary windings, it will be evident that a single primary transformer winding with the four required secondary taps could be used. Similarly, the transformers TP-2, TRB-2, TP-4 and TRB-4 could be combined into a single transformer having one primary winding and the required number of secondary winding taps. It is also to be understood that although the square wave shape of the control signal 40, and therefore of the control signals 50 and 54, is highly desirable for the most efficient switching the SCR's, a simple sinusoidal signal can be used as hereafter described in detail in connection with FIGURE 6.

Figure 2:
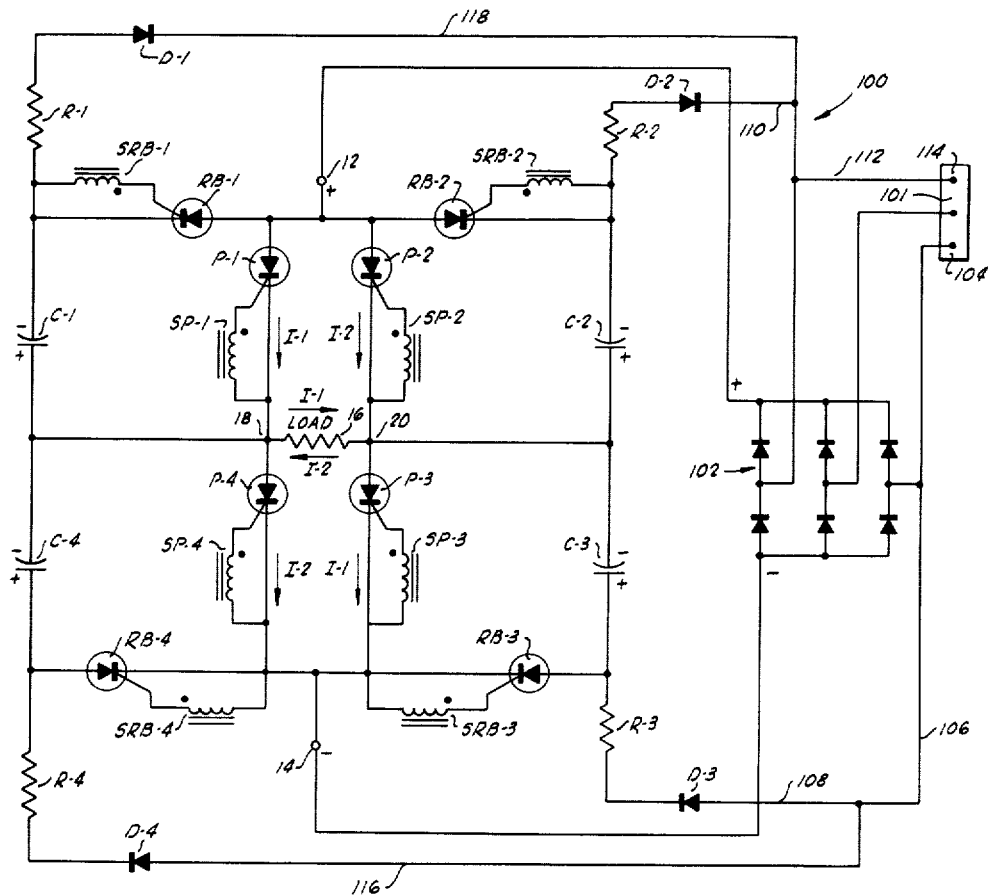
FIGURE 2 is a schematic circuit diagram of another inverter device constructed in accordance with the present invention which can be driven by a fully rectified alternating current power source.
Figure 2A:
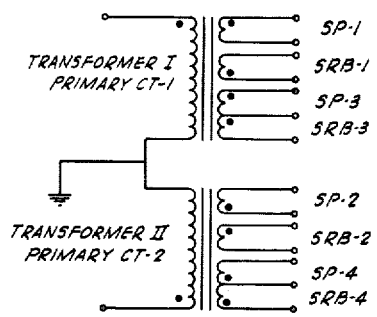
FIGURE 2A is a schematic diagram of a part of a control circuit for inverter devices in accordance with the present invention and in particular should be considered in combination with FIGURE 2.

*Embodiment of FIGURES 2 and 2A*

A second embodiment of the present invention is schematically illustrated in FIGURES 2 and 2A. The inverter device 100 shown in FIGURE 2 is basically the same as the inverter device 10 shown in FIGURE 1. However, an alternating current power source is utilized to charge the capacitors which reverse bias the four power SCR's of the inverter device 100, and the alternating current power source is converted by a full-wave rectifier to direct current to drive the power bridge. Substantially the same components are employed in the inverter device 100 as in the inverter device 10, except that the autotransformers AT-1 and AT-2 are eliminated. Therefore, the same reference characters are retained in FIGURE 2 as in FIGURE 1, with the exception that the eight control transformers of FIGURE 1 have been consolidated into two control transformers I and II having primary windings CT-1 and CT-2 and multiple tap secondary windings as illustrated in FIGURE 2A. Therefore in FIGURE 2, only the secondary windings are illustrated and the reference characters have therefore been changed from TP and TRB to SP and SRB, respectively, to designate only the secondary windings, the primary windings being shown only in FIGURE 2A.

Direct current power is applied to the power terminals 12 and 14 by a three-phase power source, such as an alternator 101, which drives a conventional full-wave rectifier 102. Power SCR's P-1, P-2, P-3 and P-4 are connected to the load 16 to form a power bridge as in FIGURE 1. When SCR's P-1 and P-3 are triggered "on," a current I-1 will pass through the load 16. When SCR's P-1 and P-3 are reverse biased "off" and power SCR's P-2 and P-4 are triggered "on," a current I-2 will pass through the load 16. The secondary windings SP-1, SP-2, SP-3 and SP-4 each apply a positive trigger pulse to the gates of the respective power SCR's thereby triggering the SCR's "on." A reverse bias circuit comprised of reverse bias SCR RB-1 and a capacitor C-1 is provided to reverse bias the power SCR P-1 to "cutoff." A reverse bias circuit including reverse bias SCR RB-2 and capacitor C-2 is provided to reverse bias power SCR P-2 to "cutoff." Similarly, a reverse bias circuit comprised of capacitor C-3 and SCR RB-3 is provided to reverse bias power SCR P-3 to "cutoff," and a reverse bias circuit comprised of capacitor C-4 and SCR RB-4 is provided to reverse bias power SCR P-4 to "cutoff."

The primary distinction between the arrangement of the reverse biasing circuits of the inverter device 100 of FIGURE 2 when compared with the reverse biasing circuits of the inverter device 10 of FIGURE 1 is that one side of the capacitors C-1 and C-4 are connected directly to the load terminal 18, and one side of the capacitors C-2 and C-3 is connected directly to the circuit load terminal 20. These connections permit the capacitors to be charged by the alternating current power supply from the alternator 101 as hereafter described. The phase terminal 104 of the alternator 101 is connected by leads 106 and 108 to a diode D-3. The circuit continues through the resister R-3 to the capacitors C-3 and C-2, then through resister R-2 and diode D-2, and leads 110 and 112 to the phase terminal 114 of the alternator 101. A similar charging circuit for the capacitors C-4 and C-1 from the phase terminal 104 to the phase terminal 114 of the alternator 101 comprises the lead 106, a lead 116, diode D-4, resister R-4, capacitors C-4 and C-1, resistor R-1, diode D-1 and leads 118 and 112.

In order to better understand how the capacitors C-1, C-2, C-3 and C-4 are charged to a potential of a polarity and magnitude sufficient to reverse bias the respective power SCR's upon discharge thereof, as phase terminal 104 of the alternator 101 becomes positive with respect to the phase terminal 114, all four capacitors C-1, C-2, C-3 and C-4 will be charged to a potential of approximately one-half the peak voltage between the terminals. The capacitors C-1 and C-4 are charged through the diodes D-4 and D-1 and capacitors C-2 and C-3 are charged through diodes D-3 and D-2. The polarity of the charge upon each of the capacitors is indicated by the charge symbols, which is such as to reverse bias the respective power SCR's upon discharge. When the power SCR's P-1 and P-3 are turned "on" to cause the current I-1 to pass through the load 16, the first load terminal 18 will assume approximately the positive potential of the power terminal 12, and the second load terminal 20 will assume approximately the negative potential of the load terminal 14. Since the first load terminal 18 is connected directly to the positive side of the capacitor C-1, the charge on the capacitor C-1 will be approximately doubled due to the increase in potential of the terminal 18. The charge on the capacitor C-1 will then be approximately equal to the peak voltage of the alternating current which is sufficient to reverse bias the power SCR P-1. Similarly, as the second load terminal 20 becomes more negative, the capacitor C-3, the negative side of which is connected directly to the terminal 20, will also receive an additional charge as described. Therefore, when the reverse bias SCR's RB-1 and RB-3 are triggered "on," the capacitors C-1 and C-3 will discharge to reverse bias the power SCR's P-1 and P-3 to "cutoff."

When the power SCR's P-2 and P-4 are triggered "on," the second load terminal 20 will become positive and thereby approximately double the charge on the capacitor C-2, and the first load terminal 18 will become more negative to approximately double the initial charge on the capacitor C-4 in the same manner described in connection with the capacitors C-1 and C-3. Then when the reverse bias SCR's RB-2 and RB-4 are triggered "on," the capacitors C-2 and C-4 will discharge to reverse bias the power SCR's P-2 and P-4 to "cutoff."

The resisters R-1, R-2, R-3 and R-4 should be selected sufficiently large to limit the phase current through the reverse bias SCR's RB-1, RB-2, RB-3 and RB-4 respectively. Current may flow through the reverse bias SCR's after they are triggered "on" for approximately one-half cycle of the alternator current after the respective power SCR has been reverse biased to "cutoff." Therefore these resisters are highly desirable because they limit this current and lessen the required average current rating for the reverse bias SCR's. The reverse bias SCR's RB-1, RB-2, RB-3 and RB-4 will revert to the "cutoff" state when the voltage across each decreases to the "cutoff" value.

As previously mentioned, the sequence of operation of the inverter device 100 of FIGURE 2 is identical to that of the inverter device 10 of FIGURE 1, and the same control signals 50 and 54 may be applied to the primary windings CT-1 and CT-2 of the control transformers I and II of FIGURE 2A. A close comparison of FIGURE 2A to FIGURE 1A will reveal that the secondary windings SP-1, SRB-1, SP-3 and SRB-4 are the full equivalent and are arranged in the same order as the transformers TP-1, TRB-1, TP-3 and TRB-3. Similarly, the secondary windings SP-2, SRB-2, SP-4 and SRB-4 correspond to the transformers TP-2, TRB-2, TP-4 and TRB-4. Therefore, when the first and second control signals 50 and 54, which are 180 degrees out of phase, are applied to the primary windings CT-1 and CT-2 of the control transformers I and II, respectively, the sequence of operating events of the inverter device 100 of FIGURE 2 is identical to the sequence of operating events of the inverter device 10 of FIGURE 1 as described previously. However, to summarize operation of the embodiment of FIGURE 2, assume first that all SCR's are "off." During the first positive half-cycle of the alternating phase current between phase terminals 104 and 114 of the alternator 101, the four capacitors C-1, C-2, C-3 and C-4 will be partially charged as described above. At time $T_0$ of the control signal 50, power SCR's P-1 and P-3 will be triggered "on" by positive trigger pulses induced in secondary windings SP-1 and SP-3. A rectified or direct current I-1 will then flow through the load 16. The first load terminal 18 will become more positive and thereby approximately double the charge on the capacitor C-1 as described. Simultaneously, the second load terminal 20 will become more negative, thereby approximately doubling the charge on the capacitor C-3. At time $T_1$ the reverse bias SCR's RB-1 and RB-3 are triggered "on" by positive trigger pulses induced in the secondary windings SRB-1 and SRB-3 respectively. The capacitors C-1 and C-3 then discharge to reverse bias the power SCR's P-1 and P-3 to "cutoff." Also at time $T_1$, preferably after a slight delay as hereafter described, the power SCR's P-2 and P-4 are triggered "on" by positive pulses induced in the secondary windings SP-2 and SP-4. A rectified or direct current I-2 then flows through the load 16. The second load terminal 20 will then become more positive and thereby cause an additional charge on the capacitor C-2. At the same time the first load terminal 18 becomes more negative and places an additional charge on the capacitor C-4. At time $T_2$, the reverse bias SCR's BR-2 and RB-4 are triggered "on" by pulses induced in the secondary windings SRB-2 and SRB-4. The capacitors C-2 and C-4 then discharge and reverse bias the power SCR's P-2 and P-4 to "cutoff." So long as the control signals 50 and 54 continue, this sequence of events will repeat to produce a square wave alternating current through the load 16 as hereafter described in greater detail.

It will be noted that the fall of the last positive pulse of the control signal 50 will reverse bias the power SCR's P-1 and P-3 to "cutoff." The reverse bias SCR's RB-1 and RB-3 will then revert to "cutoff" when the potential across each SCR falls to zero. Similarly, the power SCR's P-2 and P-4 will be reverse biased to "cutoff" by the fall of the last half-cycle of the control signal 54, and the reverse bias SCR's RB-2 and RB-4 will revert to "cutoff" when the potential across each SCR falls to zero. Therefore, upon cessation of the control signals 50 and 54, all components of the inverter device 100 will be turned "off."

Figure 3:
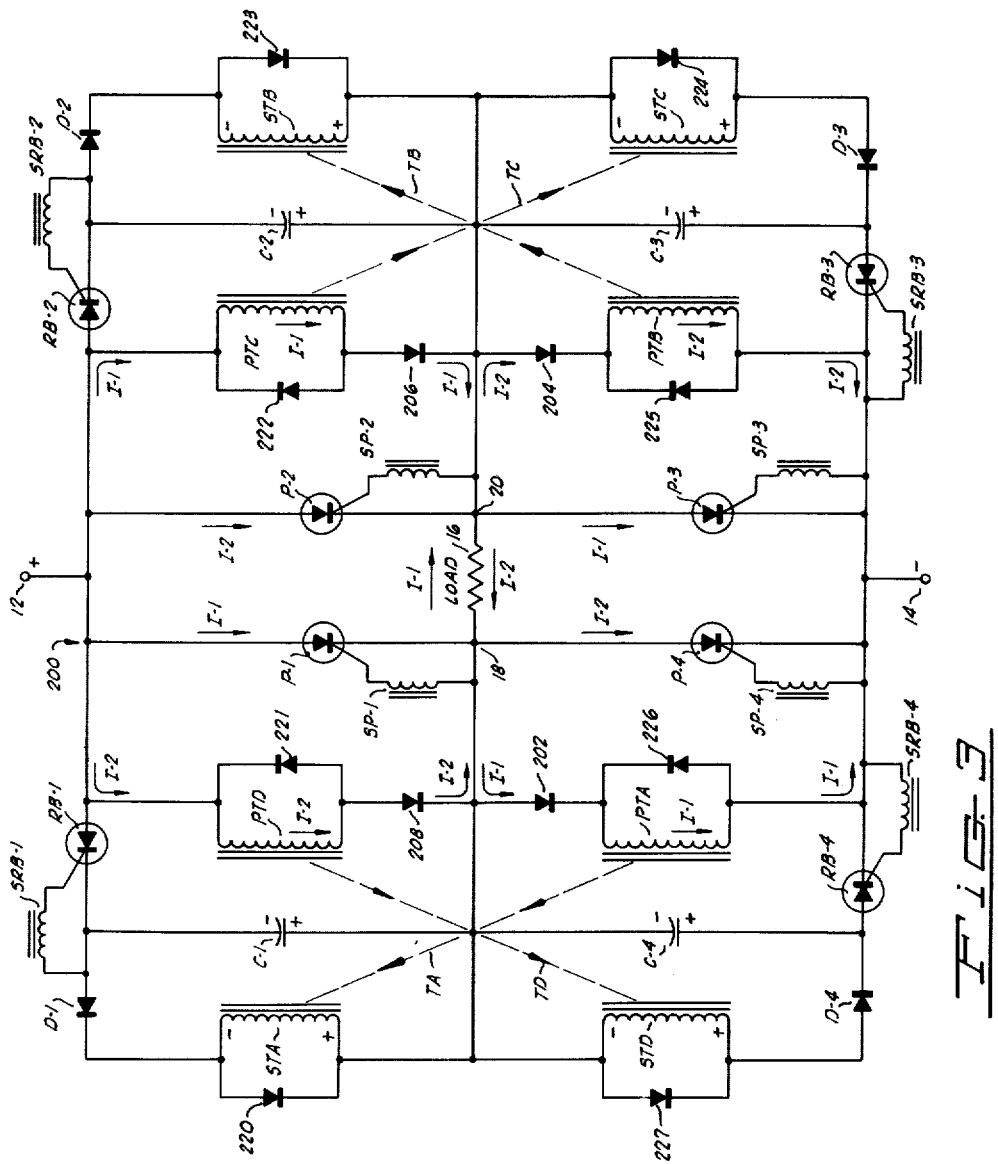
FIGURE 3 is a schematic circuit diagram of another inverter device constructed in accordance with the present invention.

*Embodiment of FIG. 3*

The inverter device 200 illustrated in FIGURE 3 has basically the same component parts and mode of operation as the inverter devices 10 and 100 of FIGURES 1 and 2, but utilizes direct current power to charge the reverse bias capacitors, C-1, C-2, C-3 and C-4 by means of transformers TA, TB, TC and TD the primary windings of which are connected in parallel with the load 16 as will hereafter be described. Referring now to FIGURE 3, a suitable direct current power source, such as a D.C. generator or battery, is connected across the positive power terminal 12 and the negative power terminal 14. The four power SCR's P-1, P-2, P-3 and P-4 are connected between the power terminals 12 and 14 and to the first and second terminals 18 and 20 of the load 16 in the manner previously described in connection with the inverter devices 10 and 100 to provide a power bridge. When SCR's P-1 and P-3 are triggered "on," with SCR's P-2 and P-4 turned "off," a current I-1 will flow through the load 16. When the SCR's P-1 and P-3 are reverse biased to "cutoff" and the SCR's P-2 and P-4 are triggered "on," a current I-2 will flow through the load 16 as indicated.

A reverse bias circuit for the power SCR P-1 is comprised of the reverse bias SCR RB-1 and the capacitor C-1, which are connected in series across the anode and cathode of the power SCR P-1. A reverse bias circuit for the power SCR P-2 is comprised of the capacitor C-2 and the reverse bias SCR RB-2. A reverse bias circuit for power SCR P-3 is comprised of the capacitor C-3 and the reverse bias SCR RB-3. Similarly, a reverse bias circuit for the power SCR P-4 is comprised of the capacitor C-4 and the reverse bias SCR RB-4. In each case, it will be noted that the reverse bias SCR is connected in opposition to the power SCR so that when the respective reverse bias SCR is triggered "on," the corresponding capacitor will be discharged in opposition to the respective power SCR and reverse bias the power SCR to "cutoff."

As in the inverter device 100 of FIGURE 2, secondary transformer windings SP–1, SP–2, SP–3 and SP–4 are connected to apply a positive trigger pulse to trigger the power SCR's P–1, P–2, P–3 and P–4, respectively, "on." Secondary transformer windings SRB–1, SRB–2, SRB–3 and SRB–4 are provided to trigger the SCR's RB–1, RB–2, RB–3 and RB–4, respectively, "on" and thereby reverse bias the respective power SCR's to "cutoff."

A charging circuit for charging the capacitor C–1 is comprised of the secondary winding STA of transformer TA and a diode D–1 connected in a loop circuit with the capacitor C–1. The primary winding PTA of the transformer TA is connected through the diode 202 between the first load terminal 18 and the negative power terminal 14. In this connection, the primary winding PTA can be considered as connected in shunt around the power SCR P–4 and also as connected in parallel with the load 16 when the current I–1 is flowing therethrough, as hereafter explained, in greater detail.

The circuitry for charging the capacitor C–2 comprises the secondary winding STB of a transformer TB which is connected through the diode D–2 to charge the capacitor C–2. The primary winding PTB of the transformer TB is connected, through a diode 204, between the second load terminal 20 and the negative power terminal 14. The diode 204 and primary winding PTB may be considered as connected in shunt around the power SCR P–3 and would also be considered as connected parallel with the load 16 when the current I–2 is flowing through the load.

The charging circuit for the capacitor C–3 is comprised of the secondary winding STC, of the transformer TC, which is connected through the diode D–3 to charge the capacitor C–3. The primary winding PTC of the transformer TC and a diode 206 are connected between the positive power terminal 12 and the second load terminal 20. Therefore, the primary winding PTC is connected in shunt around the power SCR P–2 and in parallel with the load 16 when the current I–1 is flowing through the load.

The charging circuit for the capacitor C–4 comprises the secondary winding STD of the transformer TD which is connected through the diode D–4 to charge the capacitor C–4. The primary winding PTD of the transformer TD and a diode 208 are connected between the positive power terminal 12 and the first load terminal 18. Therefore, the primary winding PTD is connected in shunt around the power SCR P–1 and parallel to the load 16 when the current I–2 is flowing through the load.

The operation of the charging circuits will best be understood by an explanation of the operation of the entire inverter device. As previously mentioned, the eight secondary transformer windings which control operation of the eight SCR's are identical to those shown in FIGURE 2A and therefore have the same operating time sequence when actuated by control signals 50 and 54. At time $T_0$, power SCR's P–1 and P–3 are turned on by positive trigger pulses induced in the secondary control windings SP–1 and SP–3. A current I–1 then flows through the load 16 as indicated, so that the load terminal 18 assumes substantially the positive potential of the power terminal 12 and the terminal 20 assumes the negative potential of the power terminal 14. The current I–1 will also flow from the positive power terminal 12 through the primary winding PTC and through the diode 206 to the negative load terminal 20. The rise in the current I–1 in the primary winding PTC will induce a current in the secondary winding STC which will charge the capacitor C–3 through the diode D–3. It will be noted that the capacitor C–3 will be charged at time $T_0$ (see FIG. 1A) when the power SCR P–3 is triggered "on" so that the capacitor C–3 is properly charged to reverse bias the power SCR P–3 to "cutoff" at time $T_1$.

When the current I–1 is flowing, the first load terminal 18 is positive with respect to the negative power terminal 14. Therefore, the current I–1, in addition to flowing through the load 16, also passes through the diode 202 and through the primary winding PTA of the transformer TA to the negative power terminal 14. As the current I–1 rises in the primary winding PTA, a charging current is induced in the secondary winding STA which charges the capacitor C–1 through the diode D–1. Therefore the capacitor C–1 is charged each time the power SCR P–1 is triggered "on" preparatory to reverse biasing the power SCR P–1 to "cutoff." At time $T_1$ (see FIG. 1A), positive trigger pulses are induced in the secondary windings SRB–1 and SRB–3 to trigger the reverse bias SCR's RB–1 and RB–3 "on." The capacitors C–1 and C–3 then discharge and reverse bias the power SCR's P–1 and P–3 to "cutoff."

Also at time $T_1$, plus a short delay as hereafter described in connection with FIGURES 5 and 6, the secondary transformer windings SP–2 and SP–4 provide a positive trigger pulse to trigger the power SCR's P–2 and P–4 "on." A current I–2 will then flow through the load 16 as indicated and the second load terminal 20 will become positive and the first load terminal 18 will become negative. Since the second load terminal 20 is positive with respect to the negative power terminal 14, a portion of the current I–2 will pass through the diode 204 and through the primary winding PTB of the transformer TB. As the current I–2 through the primary winding PTB rises, a charging current will be induced in the secondary winding STB which will charge the capacitor C–2 through the diode D–2. Similarly, since the first load terminal 18 is negative with respect to the positive power terminal 12, a portion of the current I–2 will pass through the primary winding PTD of the transformer TD and through the diode 208 to the load terminal 18. As the current I–2 through the primary windings PTB rises, a current will be induced in the secondary winding STD which will charge the capacitor C–4 through the diode D–4. Therefore, the capacitors C–2 and C–4 will be charged preparatory to reverse biasing the power SCR's P–2 and P–4 to "cutoff." At time $T_2$ (see FIGURE 1A), a positive trigger pulse will be induced in the secondary transformer windings SRB–2 and SRB–4 to trigger the reverse bias SCR's RB–2 and RB–4 "on" and discharge the capacitors C–2 and C–4 and thereby reverse bias the power SCR's P–2 and P–4 to "cutoff." This sequence of events will repeat in synchronism with the control signals 50 and 54 indefinitely. When the control signals 50 and 54 are stopped, the fall of the last positive half cycle of each signal will trigger the reverse bias SCR's "on" to reverse bias the power SCR's to "cutoff." The reverse bias SCR's will assume the "cutoff" state when the potential from the respective capacitors has dissipated to substantially zero. Therefore all components of the inverter device automatically assume the "cutoff" state upon cessation of the control signal.

The eight diodes 220, 221, 222, 223, 224, 225, 226 and 227 are provided to limit the high reverse voltages which will be induced in each of the transformers by the collapsing magnetic fields caused when the pairs of power SCR's are switched "off" and "on." The operation of these diodes will be evident to those skilled in the art. It will also be evident that instead of four separate transformers TA, TB, TC and TD, two center-tapped transformers could be used. However, two center-tapped transformers would not have the isolation advantages of the four separate transformers.

*Embodiment of FIGS. 4 and 4A*

Referring now to FIGURES 4 and 4A, an inverter device 300 is very similar to the inverter device 200 of FIGURE 3, except that the primary windings of the capacitor charging transformers are eliminated from the power bridge circuitry and the secondary windings are inductively coupled to control transformer primary windings which are energized by the control signal. Any suitable direct current power supply may be connected across the positive power terminal 12 and the negative power terminal 14. Power SCR's P–1, P–2, P–3 and P–4 are connected to the load 16 and to the power terminals 12 and 14 in the manner previously described to form a power bridge. Current I–1 will then flow through the load 16 when power SCR's P–1 and P–3 are switched "on," and a current I–2 will flow through the load 16 when the power SCR's P–2 and P–4 are switched "on," as previously described. Each power SCR has a reverse bias circuit comprised of a capacitor and a reverse bias SCR as previously described. For example, SCR RB–1 controls the discharge of capacitor C–1 for reverse biasing power SCR P–1 to "cutoff." SCR RB–2 controls the discharge of capacitor C–2 for reverse biasing SCR P–2 to "cutoff." SCR RB–3 controls the discharge of capacitor C–3 for reverse biasing power SCR P–3 to "cutoff." Similarly, SCR RB–4 controls the discharge of capacitor C–4 for reverse biasing power SCR P–4 to "cutoff." The power SCR's P–1, P–2, P–3 and P–4 are triggered "on" by positive pulses induced in the secondary transformer windings SP–1, SP–2, SP–3 and SP–4, respectively. The reverse bias SCR's RB–1, RB–2, RB–3 and RB–4 are triggered "on" by positive pulses induced in the secondary transformer windings SRB–1, SRB–2, SRB–3 and SRB–4, respectively.

Circuit means are provided for charging each of the capacitors to a potential of a polarity and magnitude sufficient to reverse bias the respective power SCR's to "cutoff" upon discharge of the respective capacitor. A secondary winding SC–1 of a control transformer CT–3 (see FIGURE 4A) is connected to charge the capacitor C–1 through a diode D–1. The secondary winding SC–2 of the control transformer CT–4 is connected to charge the capacitor C–2 through the diode D–2. The secondary winding SC–3 of the control transformer CT–3 is connected to charge the capacitor C–3 through the diode D–3. The secondary winding SC–4 of the control transformer CT–4 is connected to charge the capacitor C–4 through the diode D–4. It will be noted that the secondary windings SC–1 and SC–3 are inductively coupled to the primary winding of control transformer CT–3 and that the secondary winding SC–2 and SC–4 are inductively coupled to the primary winding of the control transformer CT–4. It will be also noted from the symbolic polarity dots 56 that the polarity of the secondary windings SC–1 and SC–3 is such that a positive current is induced in the secondary windings SC–1 and SC–3 during the rise of the control signal 50 in the primary winding of transformer CT–3. Similarly, the secondary windings SC–2 and SC–4 are so connected as to have a positive pulse induced therein during the rise of the signal 54 in the primary windings of the transformer CT–4. Therefore, the current of proper polarity is induced in the secondary windings SC–1 and SC–3 so as to charge the respective capacitors C–1 and C–3 at time $T_0$, which corresponds to the time when the power SCR's P–1 and P–3 are triggered "on." The capacitors C–1 and C–3 will then be properly charged to reverse bias the power SCR's P–1 and P–3 to "cutoff" when the reverse bias SCR's RB–1 and RB–3 are triggered "on" at time $T_1$. Similarly, the secondary windings SC–2 and SC–4 are inductively coupled to the primary windings of the control transformer CT–4 in such a manner as to produce a positive pulse at the time $T_1$ during the rise of control signal 54. The time $T_1$ corresponds to the time the power SCR's P–2 and P–4 are triggered "on" so that the capacitors C–2 and C–4 will then be properly charged to reverse bias the power SCR's P–2 and P–4 to "cutoff" at time $T_2$, which, of course, is the time the reverse bias SCR's RB–2 and RB–4 are triggered "on" to discharge the respective capacitors.

The operation of the inverter device of FIGURE 4 is substantially identical with the three previous embodiments described insofar as the switching sequence of the various SCR's is concerned. During the first rise at $T_0$ in the first control signal 50, which is applied to the primary winding of transformer CT–3, a positive pulse will be induced in secondary windings SP–1 and SP–3 to trigger the power SCR's P–1 and P–3 "on." The current I–1 will then flow in the direction indicated by the arrow through the load 16. Also during the first rise at time $T_0$ of the first control signal 50, a positive current will be induced in secondary windings SC–1 and SC–3 and the capacitors C–1 and C–3 will be charged through the diodes D–1 and D–3, respectively. Next, during the fall of the signal current 50 in the primary winding at time $T_1$, a positive trigger pulse will be induced in the secondary windings SRB–1 and SRB–3 which will trigger the reverse bias SCR's RB–1 and RB–3 "on." The capacitors C–1 and C–3 will then discharge in opposition to the power SCR's P–1 and P–3 to reverse bias the respective power SCR's to "cutoff."

During the first rise, at time $T_1$, in the second control signal 54, which is connected to the primary winding of the transformer CT–2, a positive pulse will be induced in the secondary windings SP–2 and SP–4 to trigger the power SCR's P–2 and P–4 "on." A current I–2 will then flow in the direction indicated by the arrow through the load 16. The same rise of the control signal 54 at the time $T_1$ will induce a current in the secondary windings SC–2 and SC–4 which will charge the capacitors C–2 and C–4, respectively, through the diodes D–2 and D–4, respectively. The fall at time $T_2$ of the second control signal 54 induces a positive trigger pulse in the secondary windings SRB–2 and SRB–4 to trigger the reverse bias SCR's RB–2 and RB–4 "on." The capacitors C–2 and C–4 then discharge to reverse bias the power SCR's P–2 and P–4 to "cutoff." So long as the control signals continue, this switching sequence will continue to produce an alternating power current through the load. Upon cessation of the two control signals, it will be noted that all SCR's are in the "cutoff" state, as previously described in connection with the embodiments of FIGURES 1, 2 and 3.

The operations of the inverter devices of FIGURES 1, 2, 3 and 4 have heretofore been described by reference to the simplified control signal representation of FIGURE 1A. In FIGURE 1A it is assumed that at time $T_1$ the first control signal 50 falls simultaneously with the rise of the second control signal 54. This would result in the power SCR's P–2 and P–4 being triggered "on" at the same instant that the reverse bias SCR's RB–1 and RB–3 would be triggered "on" to reverse bias the power SCR's P–1 and P–3. However, even when the power SCR's are reversed biased to switch the power SCR's to "cutoff" in a minimum time, a certain finite time period is required before the respective power SCR's can be switched to "cutoff"; and it is highly desirable that the pair of power SCR's P–1 and P–3, for example, be switched completely to "cutoff" before the pair of power SCR's P–2 and P–4 are triggered "on." Therefore, a slight time delay (t) (see FIGURES 5 and 6) is preferably provided between the instant the reverse bias SCR's are triggered "on" to reverse bias the power SCR's, and the instant the next pair of power SCR's are triggered "on" in order to insure that adequate time elapses for the respective power SCR's to be switched to "cutoff" by the applied reverse bias.

Although special circuitry is required to shape the first and second square wave control signals 50 and 54, as will be evident to those skilled in the art, the many advantages attained by the substantially instantaneous rise and fall of the square-wave control signals usually justify the added expense of the more sophisticated control system (not shown). As previously mentioned, the first and second control signals 50 and 54 are 180 degrees out-of-phase. During the rise of the first control signal 50 at time $T_0$, positive trigger pulses will be induced in the secondary windings SP–1 and SP–3 as shown in FIGURE 5, lines (c) and (d). The positive trigger pulses illustrated are induced in the secondary windings SP–1 and SP–3 of the inverter devices of FIGURES 2, 3 and 4 and in the corresponding secondary windings of transformers TP–1 and TP–3 in the inverter device of FIGURE 1. As previously described, the positive potential generated in the secondary windings SP–1 and SP–3 trigger the power SCR's P–1 and P–2 "on." At time $T_1$ the first control signal 50 falls and thereby induces a negative potential in the secondary windings SP–1 and SP–3. Since the negative potentials are of no consequence to the operation of the respective SCR's, no further reference will be made to negative potentials induced in the various secondary windings. However, the secondary windings SRB–1 and SRB–3 are wound in such a manner that a positive trigger pulse will be induced therein by the fall of the first control signal 50 at time $T_1$, as shown at lines (e) and (f) of FIGURE 5. The positive pulses induced in the windings SRB–1 and SRB–3 trigger the reverse bias SCR's RB–1 and RB–3 "on" and thereby discharge the capacitors C–1 and C–3 and reverse bias the power SCR's P–1 and P–3 to "cutoff."

If the rise of the second control signal 50 occurred at precisely the same time as the fall of the first control signal 50, the power SCR's P–1 and P–3 would not be completely switched to "cutoff" before the power SCR's P–2 and P–4 would be switched "on" because the trigger pulse applied to the gate of an SCR switches the SCR "on" considerably faster than a reverse bias from cathode to anode can switch the SCR to "cutoff." Therefore, it will be noted that the rise of second control signal 54 trails the fall of the first control signal 50 by a short time delay indicated by the reference character $(t)$. Therefore, at time $T_1$ plus $(t)$ the rise in the second control signal 54 induces a pulse of positive potential in the secondary windings SP–2 and SP–4 as illustrated at lines (g) and (h) of FIGURE 5. These positive pulses trigger the power SCR's P–2 and P–4 "on" as previously described. However, the short time delay $(t)$ provides sufficient time for the power SCR's P–1 and P–2 to be reverse biased to "cutoff" by discharge of the capacitors C–1 and C–2 as previously described before the power SCR's P–2 and P–4 are triggered "on."

The fall of the second control signal 54 at time $T_2$ induces positive pulses in the secondary windings SRB–2 and SRB–4 which trigger the reverse bias SCR's RB–2 and RB–4 "on" and thereby discharge the capacitors C–2 and C–4 to reverse bias the power SCR's P–2 and P–4 to "cutoff." The short time delay $(t)$ later the first control signal 50 again rises, at time $T_2$ plus $(t)$, and again induces a positive trigger pulse in secondary windings SP–1 and SP–3 to trigger the power SCR's P–1 and P–3 "on." However, the power SCR's P–2 and P–4 have had sufficient time to revert to the "cutoff" state as a result of the applied reversed bias. The resulting current through the load 16 is shown at line (k) of FIGURE 5 and comprises a square wave current having a spacing or time delay $(t)$ between the positive and negative going portions of the alternating current. In summary, it will be noted that events #1, #2, #3 and #4 occur sequentially at times $T_0$, $T_1$, $T_1$ plus $(t)$ and $T_2$ and will repeat so long as the control signals 50 and 54 are applied to the primary windings of the control transformers.

As previously mentioned, a pair of sinusoidal control signals 50a and 54a (see FIGURE 6) can be used to trigger the several inverter devices in substantially the same manner as the square wave control signals 50 and 54, with the exception of the devices described in FIGURE 4 and FIGURE 4a. The sinusoidal control signals and the resulting currents or potentials induced in the various secondary windings are schematically illustrated in FIGURE 6 in which the various curves are aligned with the corresponding curves of FIGURE 5 for convenience of illustration. It will be noted that the first control signal 50a is 180 degrees out of phase with the second control signal 54a, and that both the first and second control signals are in phase with the voltages of subsequent signals induced in the various secondary windings. Therefore, it will be noted that during the positive half-cycles of the signal 50a from time $T_0$ to time $T_1$, positive half-cycle trigger pulses will be induced in the secondary windings SP–1 and SP–3 as shown at lines (c) and (d) of FIGURE 6, to trigger the power SCR's P–1 and P–3 "on." Corresponding negative half-cycle pulses are induced in the secondary windings SRB–1 and SRB–3 during the period $T_1$–$T_2$, but will be disregarded because negative potentials have no effect upon the operation of the various SCR's. During the negative half-cycle of the control signal 50a from time $T_1$ to time $T_2$, a positive half-cycle pulse is induced in the secondary windings SRB–1 and SRB–3 to trigger the reverse bias SCR's RB–1 and RB–3 "on" to thereby discharge the capacitors C–1 and C–3 and reverse bias the power SCR's P–1 and P–3 to "cutoff."

Since the secondary windings SP–2 and SP–4 are inductively coupled to the second control transformer CT–2, the positive half-cycles of the second control signal 54a will induce a positive half-cycle trigger pulse in the secondary windings SP–2 and SP–4 beginning at times $T_1$ and $T_3$, as indicated at lines (g) and (h) of FIGURE 6, to trigger the power SCR's P–2 and P–4 "on." Similarly, the negative half-cycles of the control signal 54a will induce a positive trigger pulse in the secondary windings SRB–2 and SRB–4 at time $T_2$ to trigger the reverse bias SCR's RB–2 and RB–4 "on" to discharge the respective capacitors and reverse bias the power SCR's P–2 and P–4 to "cutoff."

As previously discussed with regard to FIGURE 5, it is desirable to provide a time delay $(t)$ between the time that the reverse bias SCR's RB–1 and RB–3, for example, are triggered "on" to discharge the capacitors C–1 and C–3 and apply a reverse bias to the power SCR's P–1 and P–3, and the time the next pair of power SCR's P–2 and P–4 are triggered "on." This time delay $(t)$ provides an opportunity for the power SCR's to be competely "cutoff" as a consequence of the applied reverse bias before the next succeeding pair of power SCR's are triggered "on." The time delay $(t)$ can be provided by controlling the potential or trigger level at which the various SCR's will be triggered "on." This is easily accomplished by making the trigger level or potential at which the power SCR's P–1, P–2, P–3 and P–4 will be triggered "on" higher than the trigger level or potential at which the reverse bias SCR's RB–1, RB–2, RB–3 and RB–4 will be triggered "on." The manner in which the time delay $(t)$ is provided can readily be seen from a comparison of lines (e) and (f) of FIGURE 6 with lines (g) and (h). The potentials induced in the secondary windings SRB–1 and SRB–3, lines (e) and (f), are in-phase with the potentials induced in the secondary windings SP–2 and SP–4, lines (g) and (h). However, since the trigger levels for SCR's RB–1 and RB–3 are below the trigger levels for SCR's P–2 and P–4, as the induced potentials rise, the SCR's RB–1 and RB–3 will be triggered "on" a period of time $(t)$ before the power SCR's P–2 and P–4 are triggered "on." This provides a period of time which assures that the power SCR's P–1 and P–3 are reverse biased to "cutoff" before the power SCR's RB–2 and RB–4 were triggered "on." The same time delay exists between the time the reverse bias SCR's RB–2 and RB–4 are triggered "on" and the time the power SCR's P–1 and P–3 are triggered back "on," as can be seen by a comparison of lines (i) and (j) with lines (c) and (d), at time $T_2$, for example. Therefore, as when the square-wave control signals are used, the resulting power current through the load 16 is a square wave alternating current having a time delay ($t$) between successive positive and negative half-cycles, as illustrated in line ($k$) of FIGURE 6.

It will be evident to those skilled in the art that the polarity of the control signals 50 and 54, or 50a and 54a, is not limited to that described, but can be reversed provided that corresponding adjustments are made in the polarity of the secondary windings of the control transformers. It will also be evident that since the sinusoidal control signals 50a and 54a are identical, but 180° out-of-phase, a single sinusoidal control signal could be used and applied to either a single primary winding of a single control transformer, or to both primary windings of transformers CT-1 and CT-2, or CT-3 and CT-4, provided that the polarity of all the secondary windings in transformers CT-2 and CT-4 is reversed.

From the above detailed description it will be evident that an improved inverter device for converting a direct current power supply to an alternating current power supply having a frequency which is synchronized with that of a control signal has been described. The frequency of the alternating current produced is variable over a wide range. The inverter device has an increased power rating, the rating for a sample inverter being on the order of 28,000 watts as compared to approximately 1,000 watt maximum power ratings of previously used power amplifier devices. The inverter device produces a square-wave power current for maximum power yield for a given direct current potential. The inverter device has an extremely low output impedance so that a matching transforming is not necessary. The output frequency is precisely controlled by the frequency of the input signal. Several embodiments have been described which particularly adapt the inverter device to be driven by either a battery or alternating power supply. The several embodiments disclose novel methods and circuits for charging capacitors which can be discharged at the proper time to reverse bias the power SCR's to "cutoff." In each case, no energy source is utilized greater than that of the power source being switched "off," and in most cases, the potential of the power source being switched "off" is used to charge the capacitors.

Having thus described various embodiments of our invention, it is to be understood that various changes and substitutions can be made therein without departing from the spirit and scope of our invention as defined by the appended claims.

We claim:
1. A synchronous inverter device for converting direct current to alternating current for driving a load having first and second terminals, the inverter device employing a plurality of controlled rectifier devices each having a cathode, an anode and a gate, each controlled rectifier having the characteristics of blocking current in either the forward or reverse directions until a trigger pulse is applied to the gate, then conducting conventional current in the forward direction from the anode to the cathode until a reverse bias is applied from the cathode to the anode, and then assuming the forward and reverse current blocking characteristic again, the inverter device comprising:
  a first controlled rectifier, the first load terminal and a fourth controlled rectifier connected in series in the forward direction across a direct current power source;
  a second controlled rectifier, the second load terminal and a third controlled rectifier connected in series in the forward direction across the direct current power source; and,
  control circuit means for sequentially applying:
  a trigger pulse to the first and third controlled rectifiers for causing conduction of each in the forward direction;
  a reverse bias to the first and third controlled rectifiers for restoring the forward and reverse current blocking condition of each;
  a trigger pulse to the second and fourth controlled rectifiers for causing conduction of each in the forward direction;
  and, a reverse bias to the second and fourth controlled rectifiers for restoring the forward and reverse current blocking condition of each;
  whereby the direct current power source will alternately be applied to the load in one direction through the first and third controlled rectifiers and in the other direction through the second and fourth controlled rectifiers.

2. A synchronous inverter device for converting direct current to alternating current for driving a load as defined in claim 1 wherein:
  the control circuit means is characterized by a capacitor connected across the anode and cathode of each of the controlled rectifiers, means for charging the capacitors to a potential of a polarity and magnitude sufficient to reverse bias the controlled rectifiers to the current blocking condition upon discharge thereof;
  and means for discharging the respective capacitors to reverse bias the controlled rectifiers in the proper sequence.

3. A synchronous inverter device for converting direct current to alternating current for driving a load as defined in claim 2 wherein the means for charging the capacitors to a potential of a polarity and magnitude sufficient to reverse bias the controlled rectifiers to the current blocking condition upon discharge thereof are characterized by:
  a transformer the primary winding of which is connected in series with the load to receive the current passing through the load and the secondary winding of which is connected through a diode to charge the capacitor.

4. A synchronous inverter device for converting direct current to alternating current for driving a load as defined in claim 2 wherein the means for charging the capacitors to a potential of a polarity and magnitude sufficient to reverse bias the controlled rectifiers to the current blocking condition upon discharge thereof are characterized by:
  an alternating current source connected through a diode to partially charge the respective capacitors, the capacitors being connected to a load terminal whereby the capacitors will be further charged to the necessary reverse bias magnitude by the drop in potential across the load.

5. A synchronous inverter device for converting direct current to alternating current for driving a load as defined in claim 2 wherein the means for charging the capacitors to a potential of a polarity and magnitude sufficient to reverse bias the controlled rectifiers to the current blocking condition upon discharge thereof are characterized by:
  a transformer the primary winding of which is connected in parallel with the load and the secondary winding of which is connected through a diode to charge the respective capacitors.

6. A synchronous inverter device for converting direct current to alternating current for driving a load as defined in claim 2 wherein the means for charging the capacitors to a potential of a polarity and magnitude sufficient to reverse bias the controlled rectifiers to the current blocking condition upon discharge thereof are characterized by:
  a transformer the secondary winding of which is connected through a diode to charge the respective capacitors and the primary winding of which is energized by an alternating current control signal also utilized for controlling the sequence of the control circuit means.

7. A synchronous inverter device for converting direct current to alternating current for driving a load as defined in claim 1 wherein the control circuit means is characterized by:
a capacitor and an additional controlled rectifier connected in series across the anode and cathode of each of said first, second, third and fourth rectifiers, each additional controlled rectifier being connected in opposition to each of said four controlled rectifiers for applying a discharge from the respective capacitor to reverse bias each of said four controlled rectifiers;
circuit means for charging each of the capacitors to a potential of a polarity and magnitude to reverse bias each of said four controlled rectifiers when discharged; and,
circuit means for applying a trigger pulse to each of the additional controlled rectifiers to discharge the respective capacitor and reverse bias each of said controlled rectifiers in the proper sequence.

8. A synchronous inverter device for converting direct current to alternating current for driving a load as defined in claim 1 wherein the control circuit means is characterized by:
subcircuit means for applying a reverse bias to each of said first, second, third and fourth controlled rectifiers comprising a capacitor and an additional controlled rectifier connected in series across the anode and cathode of each of said first, second, third and fourth controlled rectifiers, the additional controlled rectifiers being connected in opposition to said first, second, third, and fourth controlled rectifiers;
subcircuit means for charging the capacitors to a potential of a polarity and magnitude sufficient to reverse bias each of the said four controlled rectifiers when discharged, and
subcircuit means for applying a trigger pulse to each of the additional controlled rectifiers for causing the additional controlled rectifiers to conduct and discharge the respective capacitors and thereby reverse bias each of the said first, second, third and fourth controlled rectifiers in the proper sequence.

9. A synchronous inverter device for converting direct current to alternating current for driving a load as defined in claim 1 wherein the control circuit means is further characterized by:
circuit means for producing first and second alternating current control signals 180 degrees out of phase;
circuit means for producing a positive pulse responsive to the rise of the positive half-cycle of the first control signal for applying a trigger pulse to the first and third controlled rectifiers;
circuit means for applying a reverse bias to the first and third controlled rectifiers responsive to the fall of the positive half-cycle of the first control signal;
circuit means for producing a positive pulse responsive to the rise of the positive half-cycle of the second control signal for applying a trigger pulse to the second and fourth controlled rectifiers; and,
circuit means for applying a reverse bias to the second and fourth controlled rectifiers responsive to the fall of the positive half-cycle of the second control signal.

10. A synchronous inverter device for converting direct current to alternating current for driving a load having first and second terminals, the inverter device employing a plurality of silicon controlled rectifier semiconductor devices known as SCR's each having a cathode terminal, an anode terminal and a gate terminal and having the characteristics of normally remaining "cutoff" to block current in either the conventional forward or reverse directions until a positive trigger pulse is applied to the gate terminal, then being turned "on" for conducting conventional current in the forward direction from anode to the cathode until a reverse bias is applied from cathode to anode, and then assuming the "cutoff" condition to block the forward and reverse current, the inverter device comprising:
a first power SCR, the first load terminal, and a fourth power SCR connected in series in the forward direction across a direct current power source;
a second power SCR, the second load teminal, and a third power SCR connected in series in the forward direction across the direct current power source;
a reverse bias circuit comprised of a capacitor and a control SCR connected in series across the anode and cathode of each of the power SCR's, the control SCR's being connected to opposition to the power SCR's whereby when the control SCR's are turned "on" the capacitors will be discharged to reverse bias the respective power SCR's;
circuit means for charging the capacitors to a potential of a direction and magnitude to reverse bias the respective power SCR through the reverse bias circuit upon discharge thereof;
and control circuit means for sequentially:
applying a trigger pulse to the gates of the first and third power SCR's for turning the first and third power SCR's "on";
applying a trigger pulse to the control SCR's for the first and third power SCR's for turning the control SCR's "on" and thereby discharging the respective reverse bias capacitors to reverse bias the respective power SCR's to "cutoff";
applying a trigger pulse to the gates of the second and fourth power SCR's for turning the power SCR's "on"; and,
applying a trigger pulse to the gates of the control SCR's for the second and fourth power SCR's thereby turning the control SCR's "on" and discharging the respective reverse bias capacitors to reverse bias the respective power SCR's to "cutoff."
whereby the direct current power source will be passed first in one direction through the load by the first and third power SCR's and then in the other direction by the second and fourth power SCR's.

11. A synchronous inverter device for converting direct current to alternating current for driving a load as defined in claim 10 wherein the control circuit means is characterized by:
circuit means for producing first and second alternating current control signals 180 degrees out-of-phase;
first and second transformers having first and second primary windings, respectively, the first primary winding being connected to the last mentioned circuit means for receiving the first control signal and the second primary winding being connected to the last mentioned circuit means for receiving the second control signal;
a secondary winding of the first transformer connected to apply a positive trigger pulse to the gate terminal of the first and third power SCR's during the rise of the first control signal;
a secondary winding of the first transformer connected to apply a positive trigger pulse to the gate terminals of the control SCR's for the first and third power SCR's during the fall of the first control signal;
a secondary winding of the second transformer connected to apply a positive trigger pulse to the gate terminals of the second and fourth power SCR's during the rise of the second control signal; and,
a secondary winding of the second transformer connected to apply a positive trigger pulse to the gate terminals of the control SCR's for the second and fourth power SCR's during the fall of the second control signal.

12. A synchronous inverter device for converting direct current to alternating current for driving a load as defined in claim 10 wherein the circuit means for charging the capactitors to a potential of a direction and magnitude to reverse bias the respective power SCR's upon discharge thereof are characterized by:

the primary winding of a transformer connected in series between the load and the respective power SCR; and, the secondary winding of the transformer is connected through a diode to charge the respective capacitor, the secondary winding and diode being connected in shunt around the respective control SCR;

the polarity of the primary and secondary windings and the direction of the diode being such that upon conduction of the respective power SCR, the rise of the power current through the primary winding of the respective transformers will induce a current in the respective secondary winding which will pass through the respective diode and charge the respective capacitor.

13. A synchronous inverter device for converting direct current to alternating current for driving a load as defined in claim 10 wherein the circuit means for charging the capacitors to a potential of a direction and magnitude to reverse bias the respective power SCR's upon discharge thereof are comprised of:

first and second autotransformers;

the primary winding of the first autotransformer being connected between the first load terminal and the load;

the primary winding of the second autotransformer being connected between the second load terminal and the load;

the secondary winding of the first autotransformer and a first diode being connected in series between the first load terminal and the capacitor in the reverse bias circuit for the first power SCR whereby the current induced in the secondary winding when the first power SCR is turned "on," will charge the capacitor for the first power SCR, the secondary winding of the first autotransformer and the first diode being connected in shunt around the control SCR in the reverse bias circuit for the first power SCR;

a fourth diode connected between the secondary winding of the first autotransformer and the capacitor in the reverse bias circuit for the fourth power SCR whereby the current induced in the secondary winding when the fourth power SCR is turned "on" will charge the capacitor for the fourth power SCR, the secondary winding of the first autotransformer and the fourth diode being connected in shunt around the control SCR in the reverse bias circuit for the fourth power SCR;

the secondary winding of the second autotransformer and a third diode connected in series between the second load terminal and the capacitor in the control circuit for the third power SCR, whereby the current induced in the secondary winding when the third power SCR is turned "on" will charge the capacitor for the third power SCR, the secondary winding of the second autotransformer and the third diode being connected in shunt around the control SCR in the reverse bias circuit for the third power SCR; and, a second diode connected between the secondary winding of the second autotransformer and the capacitor in the reverse bias circuit for the second power SCR whereby the current induced in the secondary winding when the second power SCR is turned "on" will charge the capacitor for the second power SCR, the secondary winding of the second autotransformer and the second diode being connected in shunt around the control SCR in the reverse bias circuit for the second power SCR.

14. A synchronous inverter device for converting direct current to alternating current for driving a load as defined in claim 10 wherein:

the direct current power source is an alternator connected to a full-wave rectifier; and, the circuit means for charging the capacitors to a potential of a direction and magnitude to reverse bias the respective power SCR's upon discharge thereof comprises;

circuit means connecting a diode, a resistor and the respective capacitor in series across the alternator for applying an alternating current to the capacitor, the diode being directed to permit charging of the respective capacitors in a direction for discharge through the reverse bias circuit capacitors in opposition to the respective power SCR; and, one side of the respective capacitor is connected directly to a load terminal, whereby the respective capacitors will be partially charged through the respective diodes by the voltage from the alternator and the charge will be approximately doubled when the respective power SCR is turned "on" due to the voltage drop across the load.

15. A synchronous inverter device for converting direct current to alternating current for driving a load as defined in claim 10 wherein the circuit means for charging the capacitor to a potential of a direction and magnitude to reverse bias the respective power SCR's upon discharge thereof are characterized by:

a secondary transformer winding connected through a diode to charge each capacitor;

first primary transformer windings inductively coupled to the secondary transformer windings which are connected to charge the capacitors of the reverse bias circuits for the first and third power SCR's, the first primary transformer windings being connected parallel to the load when the first and third power SCR's are turned "on," whereby the power current will pass through both the load and the first primary windings when the first and third power SCR's are turned "on" and the rise in current through the primary windings will induce a current in the respective secondary windings to charge the respective capacitors;

second primary transformer windings inductively coupled to the secondary transformer windings which are connected to charge the capacitors of the reverse bias circuits for the second and fourth power SCR's, the second primary transformer windings being connected parallel to the load when the second and fourth power SCR's are turned "on," whereby the power current will pass through both the load and the second primary windings when the second and fourth power SCR's are turned "on" and the rise in current through the primary winding when the second and fourth power SCR's are turned "on" will induce a current in the respective secondary windings to charge the respective capacitors.

16. A synchronous inverter device for converting direct current to alternating current for driving a load as defined in claim 10 wherein the circuit means for charging the capacitors to a potential of a direction and magnitude to reverse bias the respective power SCR's upon discharge thereof are characterized by:

a first transformer, the secondary winding of which is connected through a diode to charge the capacitor for reverse biasing the first power SCR and the primary winding of which is connected in shunt around the fourth power SCR;

a fourth transformer, the secondary winding of which is connected through a diode to charge the capacitor for reverse biasing the fourth power SCR and the primary winding of which is connected in shunt around the first power SCR;

a second transformer, the secondary winding of which is connected through a diode to charge the capacitor for reverse biasing the second power SCR and the primary winding of which is connected in shunt around the third power SCR; and, a third transformer, the secondary winding of which is connected through a diode to charge the capacitor for reverse biasing the third power SCR and the primary winding of which is connected in shunt around the second power SCR.

17. A synchronous inverter device for converting direct current to alternating current for driving a load as defined in claim 11 wherein the circuit means for charging the capacitors to a potential of a direction and magnitude to reverse bias the respective power SCR's upon discharge thereof are characterized by:

a secondary winding of the first transformer connected through a diode to charge the capacitors for reverse biasing the first and third power SCR's, the secondary winding being connected to charge the capacitors by the current induced therein during the rise of the first alternating current control signal;

a secondary winding of the second transformer connected through a diode to charge the capacitors connected to reverse bias the second and fourth power SCR's, the secondary winding being connected to charge the capacitor by the current induced therein during the rise of the second alternating current control signal.

References Cited in the file of this patent

UNITED STATES PATENTS 2,987,666    Manteuffel _____ June 6, 1961

UNITED STATES PATENT OFFICE
CERTIFICATE OF CORRECTION

Patent No. 3,103,616            September 10, 1963

Jimmy R. Cole et al.

It is hereby certified that error appears in the above numbered patent requiring correction and that the said Letters Patent should read as corrected below.

Column 4, line 60, for "locking" read -- blocking --; column 5, line 30, before "reverse" strike out "the"; column 10, lines 54, 55 and 60, for "resister" read -- resistor --; column 11, lines 32 and 39, for "resisters" read -- resistors --.

Signed and sealed this 7th day of July 1964.

(SEAL)
Attest:

ERNEST W. SWIDER
Attesting Officer

EDWARD J. BRENNER
Commissioner of Patents